United States Patent
Gregg-Albers et al.

(10) Patent No.: US 10,834,936 B2
(45) Date of Patent: Nov. 17, 2020

(54) CONCENTRATE FOR MILKY BEVERAGES

(71) Applicant: Koninklijke Douwe Egberts B.V., Utrecht (NL)

(72) Inventors: Julia L. Gregg-Albers, Munich (DE); Alan Wolfschoon-Pombo, Munich (DE); Hermann Eibel, Munich (DE)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 14/655,139

(22) PCT Filed: May 6, 2015

(86) PCT No.: PCT/IB2015/000750
§ 371 (c)(1),
(2) Date: Jun. 24, 2015

(87) PCT Pub. No.: WO2015/170164
PCT Pub. Date: Nov. 12, 2015

(65) Prior Publication Data
US 2016/0255850 A1    Sep. 8, 2016

(30) Foreign Application Priority Data
May 9, 2014    (GB) .................................. 1408223.4

(51) Int. Cl.
*A23C 13/14*    (2006.01)
*A23C 9/14*     (2006.01)
(Continued)

(52) U.S. Cl.
CPC ................ *A23C 13/14* (2013.01); *A23C 1/00* (2013.01); *A23C 1/16* (2013.01); *A23C 9/1422* (2013.01);
(Continued)

(58) Field of Classification Search
CPC ....... A23C 13/14; A23C 9/1422; A23C 9/142; B65D 85/8043; B65D 85/804; B65D 84/804
See application file for complete search history.

(56) References Cited

U.S. PATENT DOCUMENTS

| | | |
|---|---|---|
| 5,223,229 A | 6/1993 | Dalan et al. |
| 5,223,299 A | 6/1993 | Dalan |

(Continued)

FOREIGN PATENT DOCUMENTS

| | | |
|---|---|---|
| EP | 1676786 A2 | 7/2006 |
| GB | 2212380 A | 7/1989 |

(Continued)

OTHER PUBLICATIONS

Kielczewska, Katarzyna, Antoni Kruk, Maric Czerniewicz, and Elibieta Haponiuk. "Effects of High-Pressure Homogenization on the Physicochemical Properties of Milk With Various Fat Concentrations." 2006. Polish Journal of Food and Nutrition Sciences. vol. 15/56. pp. 91-94.*

(Continued)

*Primary Examiner* — Ericson M Lachica
(74) *Attorney, Agent, or Firm* — Fitch, Even, Tabin & Flannery LLP

(57) ABSTRACT

The present invention relates to a method of producing a liquid dairy concentrate, the method comprising:
  providing a liquid dairy ingredient having a fat content of at least 35 wt %;
  concentrating the liquid dairy ingredient by ultrafiltration and/or diafiltration to obtain a concentrated liquid dairy ingredient as the retentate;
  adding sucrose and/or trisodium citrate to form a modified retentate;
  blending the modified retentate with one or more further ingredients; and (Continued)

homogenising the blend to form a liquid dairy concentrate, wherein, during the step of blending the modified retentate with said one or more further ingredients, the modified retentate is at a temperature of at least 60° C.

14 Claims, 3 Drawing Sheets

(51) Int. Cl.

| | |
|---|---|
| A23C 1/16 | (2006.01) |
| A23C 9/15 | (2006.01) |
| A23C 13/12 | (2006.01) |
| A23C 1/00 | (2006.01) |
| B65D 85/804 | (2006.01) |
| A23C 9/142 | (2006.01) |
| A23C 9/156 | (2006.01) |

(52) U.S. Cl.
CPC .............. *A23C 9/156* (2013.01); *A23C 13/12* (2013.01); *B65D 85/804* (2013.01)

(56) References Cited

U.S. PATENT DOCUMENTS

| | | | |
|---|---|---|---|
| 7,640,843 B2 | 1/2010 | Halliday et al. | |
| 2010/0055290 A1* | 3/2010 | Schmidt ................... | A23C 3/03 426/587 |
| 2010/0104711 A1* | 4/2010 | Kimmel ................... | A23F 5/243 426/330.2 |
| 2013/0196030 A1 | 8/2013 | Criezis | |
| 2013/0196031 A1* | 8/2013 | Criezis ................... | A23C 9/1422 426/74 |

FOREIGN PATENT DOCUMENTS

| | | |
|---|---|---|
| JP | H05-508784 A | 12/1993 |
| RU | 2331348 C2 | 8/2008 |
| WO | 1992001479 A1 | 2/1992 |
| WO | 2004064585 A1 | 8/2004 |
| WO | 2006012506 A1 | 2/2006 |
| WO | 2012033927 A2 | 3/2012 |

OTHER PUBLICATIONS

Belitz, H.-D., Grosch W (1987) Food Chemistry Springer Verlag, p. 394 (1 pg.).

Combined Search and Examination Report dated Nov. 11, 2014 for Application No. GB1408223.4 (6 pgs.).

Chinese Office Action, dated Mar. 4, 2019 for corresponding Chinese Application No. 201580035776.X with English translation (9 pgs).

Morin et al: "Effect of processing on the composition and microstructure of buttermilk and its milk fat globule membranes", International Dairy Journal, Elsevier Applied Science, Barking, GB, vol.17, No. 10, Jul. 27, 2007 (Jul. 27, 2007), p. 1179-1187, XP022170495, ISSN: 0958-6946, DOI: 10.1016/J.IDAIRYJ.2007. 03.010.

A K Smith et al: "Microstructure and rheological properties of whipped cream as alected by heat treatment and addition of stabilizer", International Dairy Journal, Dec. 31, 2000 (Dec. 31, 2000), p. 295-301, XP055206925, Retrieved from the Internet: URL :http ://ac. els-cd n. co m/S0958694600000431 /1 -s2. 0-S0958694600000431 -main.pdf? _id=d4fa6932-3f2d-11 e5-a38e-00000aab0f02&acdnat= 1439190358 b70bec2d15fbfc500a61 0a5a8bede273 [retrieved on Aug. 10, 2015].

International Preliminary Report on Patentability dated Nov. 15, 2016, for corresponding International Application 1o. PCT/IB2015/000750 (10 pages).

Japanese Office Action dated Aug. 17, 2017, for corresponding Japanese Application No. 2016-567013, with English Translation (9 pages).

Russian Office Action dated Jan. 10, 2018, for corresponding Russian Application No. 2016144078, with English Translation (7 pages).

* cited by examiner

CONCENTRATE FOR MILKY BEVERAGES

CROSS REFERENCE TO RELATED APPLICATIONS

This application is a U.S. national phase application of International Application No. PCT/IB2015/000750, filed May 6, 2015, which claims benefit from from Great Britain Application 1408223.4, filed May 9, 2014, which are hereby incorporated herein by their reference in their entirety.

FIELD

This disclosure relates to a method of producing a concentrated ingredient for providing milky beverages or the milky portion of a beverage, such as a Latte.

Background

It is known to produce milk beverages from a milk concentrate and, indeed, the use of skimmed milk powders to whiten coffee beverages is commonplace. Such milk powders serve to provide a milk beverage on reconstitution with water and are often used in beverage preparation machines to provide a convenient source of milk for a consumer looking to reproduce café-style beverages at home. For example, it is known to provide beverage capsules containing a mixture of coffee powder and a milk powder which can be dissolved to provide a Latte beverage.

It is also known to provide a liquid dairy ingredient for use in such beverage preparation systems. For example, EP1676786 describes the use of a concentrated liquid milk ingredient which can be used to provide a milk beverage. In particular, it is an aim of EP1676786 to provide a foamed milk beverage and it was discovered that the use of a liquid ingredient encouraged foam production compared to a reconstituted powder ingredient.

WO2006/012506 and WO2012/033927 disclose the production of concentrated liquid concentrates for use in preparing beverages by dilution.

GB2212380 relates to a milk concentrate and a process for the preparation thereof.

US2013196031 relates to dairy mineral fortified liquid dairy products and method of making said products.

US2010/055290 relates to a heat stable concentrated dairy liquid and cream product.

SUMMARY

Accordingly, it is desirable to provide an improved production method and/or tackle at least some of the problems associated with the prior art or, at least, to provide a commercially useful alternative thereto. In particular, the disclosure relates to a method for forming the ingredient, preferably from cream, without the risk of butter formation.

Accordingly, in a first aspect the present disclosure provides a method of producing a liquid dairy concentrate, the method comprising:
providing a liquid dairy ingredient having a fat content of at least 35 wt %;
concentrating the liquid dairy ingredient by ultrafiltration and/or diafiltration to obtain a concentrated liquid dairy ingredient as the retentate;
adding sucrose and/or trisodium citrate to form a modified retentate;
blending the modified retentate with one or more further ingredients; and
homogenising the blend to form a liquid dairy concentrate,
wherein, during the step of blending the modified retentate with said one or more further ingredients, the retentate is at a temperature of at least 60° C.

The present invention will now be further described. In the following passages different aspects of the invention are defined in more detail. Each aspect so defined, may be combined with any other aspect or aspects unless clearly indicated to the contrary. In particular, any feature indicated as being preferred or advantageous may be combined with any other feature or features indicated as being preferred or advantageous.

A dairy ingredient is a food product produced from the milk of mammals, typically cows. Dairy ingredients typically take a number of forms including milk, cream, and butter. Milk products directly obtained tend to separate (or can be separated) into fractions depending on the relative fat content. In this way a cream layer may form on top of a milk and the relative fat contents will be at least 18 wt % for the cream and less than 5.5 wt % for the milk. Different fat levels can be achieved by concentrating and/or mixing milk and cream fractions.

A "liquid" dairy ingredient is an ingredient comprising sufficient water to be pumpable. A typical liquid dairy ingredient for the present process will have a solids content in the range of from 30 to 55 wt %. It will be appreciated that the liquid ingredient will be a suspension of milk-derived fats and proteins.

In the context of the product produced by the method described herein, a concentrate is a composition suitable for mixing with an aqueous medium to form a beverage. That is, the concentrate would preferably not be a ready to drink formulation and would instead by consumed with dilution. The ratio of dilution would preferably be in an amount of from 5:1 and 9:1. For example, a 25 g concentrate would preferably be dilute with between 125 g and 225 g of water to form a final beverage between 150 and 250 g.

The fats present in the concentrate are preferably dairy fats. That is, fats which are derived from milk, rather than supplemented or added fat components.

Casein is a milk protein and is well known along with whey protein in dairy ingredients. The levels of fat and protein which can be found in different dairy ingredients varies significantly by ingredient type and any processing that has been conducted. A cream ingredient will typically have a high fat content and a low protein content: for example, the protein content of a 40 wt % fat-content cream may be in the region of 2-3 wt %, of which 80 wt % may typically be casein protein. The protein content of a 0.03 wt % fat-content skimmed milk product, however, may be in the region of 8-10 wt %, of which 90 wt % may typically be casein protein. Accordingly, the inventors have found that they can increase the levels of casein in a cream by concentrating the cream and then introducing a skimmed milk concentrate.

Native micellular casein is casein provided in an aqueous form such that the casein has not been denatured and has formed micelles in solution. These are typically calcium micelles in view of the minerals present in milk. An ideal source of native micellular casein is concentrated milk, especially microfiltrated skimmed milk concentrates which are aqueous solutions and rich in casein.

Ultrafiltration is a well-known process in the art. Ultrafiltration (UF) is a variety of membrane filtration in which conditions, such as pressure or concentration gradients, lead to a separation through a semipermeable membrane. Suspended solids and solutes of high molecular weight are retained in the so-called retentate, while water and low molecular weight solutes pass through the membrane in the permeate. Ultrafiltration is not fundamentally different from microfiltration, nanofiltration or membrane gas separation, except in terms of the size of the molecules it retains. Ultrafiltration in the present method is preferably carried out at an elevated temperature, preferably at least 30° C., preferably from 40 to 60° C. and most preferably about 50° C.

Diafiltration is a well-known process in the art. Diafiltration is a dilution process that involves removal or separation of components (permeable molecules like salts, small proteins, solvents etc.,) of a solution based on their molecular size by using micro-molecule permeable filters in order to attain pure solution. In the treatment of the dairy ingredient, diafiltration is used to remove lactose from the dairy ingredient.

Homogenisation is a process used to ensure the homogeneity of two immiscibleliquids. It is well known to homogenise dairy compositions to ensure that the fat content is evenly distributed in the aqueous portion of the composition. Homogenization breaks the fat into smaller sizes so it no longer separates, allowing the sale of non-separating milk at any fat specification. Homogenisation is preferably a two-step high pressure process, such as a first step at from 100 to 300 Bar (preferably about 140-200 Bar) and a second step at from 10 to 30 Bar (preferably about 20 Bar).

Pasteurisation or retorting is a well-known process in the art. It involves heating a food composition to a specific temperature for a predefined length of time and then immediately cooling it after it is removed from the heat. This process slows spoilage caused by microbial growth in the food. Unlike sterilisation, pasteurisation is not intended to kill all micro-organisms in the food. Instead, it aims to reduce the number of viable pathogens so they are unlikely to cause disease.

As will be appreciated, the size of a milk beverage produced from concentrated ingredients will depend on the extent to which the ingredients can be diluted without losing the desirable flavour. Accordingly, for capsules, such as those disclosed in EP1676786, which is incorporated herein by reference, it is necessary to tailor the size of the capsule to ensure that sufficient concentrate can be provided.

The present inventors have found that it would be desirable to provide a full sized milk beverage from a reduced amount of beverage concentrate. The inventors have now found that a milk-flavoured beverage can be provided by the dissolution of a cream-derived concentrate in a higher dilution than can be achieved with a milk-derived ingredient. However, the use of a more concentrated milk ingredient was found to be unduly process intensive and there was an increased likelihood for the high fat composition to form butter during processing.

The inventors have now found that several key steps can be taken which serve to prevent the formation of butter during the processing. Butter formation is extremely undesirable: If a product undergoes minor butter production even at any point in the process, the resulting beverages are darker, sweeter, and thinner in finished goods. Generally a separation of oil will also be visible if only the dairy portion of the beverage is brewed independent of the coffee.

The method comprises a first step of providing a liquid dairy ingredient having a fat content of at least 35 wt %. The liquid dairy ingredient will preferably be cream and will preferably have a fat content of about 40 wt %.

The method comprises a second step of concentrating the liquid dairy ingredient by ultrafiltration and/or diafiltration to obtain a concentrated liquid dairy ingredient as the retentate. These process steps are preferably carried out to achieve a concentration of from 1.1 to 1.3 times. The fat content of the concentrated retentate is preferably at least 44 wt %.

The method comprises a step of adding sucrose and/or trisodium citrate to form a modified retentate. Preferably these are added as a slurry and preferably in an amount suitable to provide about 25 wt % of the final formulation.

Preferably the sucrose-supplemented retentate is then cooled to less than 8° C. and stored for at least 2 minutes. It was surprisingly found that this cooling and holding step had a significant effect on the final beverage foam achieved. Without wishing to be bound by theory, it may be that there is an impact on the protein structures or the calcium mineral distribution which provides this advantageous effect.

The method then comprises blending the modified retentate with one or more further ingredients, such as flavourings and stabilisers, and homogenising the blend to form a liquid dairy concentrate. During the step of blending the modified retentate with said one or more further ingredients, the modified retentate is at a temperature of at least 60° C., preferably in the region of from 70 to 80° C.

Preferably after the step of adding sucrose and/or trisodium citrate to the retentate, the retentate is stored for at least 2 minutes, preferably at least 30 minutes, preferably at least 1 hour at a temperature of at most 12° C., preferably at most 8° C. More preferably for at most 72 hours, more preferably at most 24 hours, even more preferably at most 12 hours, at a temperature of at most 8° C. (preferably in the range of from 5 to 8° C.). The ability to hold the concentrated dairy ingredient for this time allows for standardisation of the product, as well as process efficiencies with the performance of larger batch processes. It was found that it was possible to store the concentrated dairy ingredient under cold conditions without butter formation provided that either sucrose (both granulated and powdered) or tri-sodium citrate had been added.

Preferably the one or more further ingredients are selected from buffers, stabilisers, flavourings, minerals and casein.

The liquid dairy concentrate may contain one or more stabiliser, such as gum arabic. The stabiliser is preferably provided in an amount of from 0.625 wt %-1.0 wt % of the concentrate.

The liquid dairy concentrate may contain salt. Salt is preferably provided in an amount of from 0.8 wt %-1.4 wt % of the concentrate. The liquid dairy concentrate may contain vitamin or mineral supplements. Vitamin or mineral supplements are preferably provided in an amount of from 0-2.5 wt %, more preferably from 1.25 wt %-2.5 wt % of the concentrate. The liquid dairy concentrate may contain up to 1 wt % of other flavourings.

The liquid dairy concentrate may contain sugar (including any added sucrose as discussed herein). The sugar is preferably provided in an amount of from 12.5 wt %-36 wt % of the concentrate, preferably about 25 wt %.

Preferably the concentrate consists of the dairy ingredient, together with one or more components selected from flavourings, stabilisers, salt, sugar and vitamin/mineral supplements, and a source of casein.

Preferably the homogenising of the blend is a two-stage high-pressure homogenisation.

Preferably the retentate has from 45 to 55 wt % solids. Preferably the retentate has at least 44 wt % fat and/or less than 1 wt % lactose.

Preferably during the step of blending the retentate with the one or more further ingredients, the retentate is at a temperature of greater than 65° C., more preferably from 70 to 80° C., and most preferably about 75° C. It was found that hot mixing at a temperature of at least 60° C. provided support for the fat globule membranes of the fat particles, resulting in less free fat release and limiting butter formation during storage. Even a comparison of 50° C. versus 60° C. indicated that an increase of 10° C. can help prevent free fat release in this matrix.

Preferably the liquid dairy ingredient comprises cream and, preferably, has a fat content of from 38 to 45 wt %, preferably about 40 wt %. The high levels of fat allow for an efficient process and a high concentration of the final concentrate once the further ingredients necessary to form the beverage concentrate have been included.

Preferably the sucrose is added, preferably in granulated form, in an amount of from 10 to 40 wt %, more preferably about 25 wt %.

Preferably the one or more further ingredients comprise casein and wherein the casein is provided as a concentrated milk ingredient. Preferably the casein is provided as native micellular casein. In particular, the casein is preferably provided as a concentrated milk ingredient. The casein is preferably provided in liquid form to ensure that the casein is provided as native micelles. Accordingly, the casein is preferably provided as a concentrated liquid dairy protein source, such as a microfiltrated skimmed milk. The concentrated liquid dairy protein source is preferably provided in an amount of 8-22 wt %, more preferably from 12 to 18 wt % of the concentrate. Advantageously the protein source comprises a higher level of heat stable casein compared to whey protein in order to prevent whey protein gelation in downstream sterilization treatment of the final beverage system. The level of casein present in the concentrate will preferably be from 1 to 4 wt %, more preferably from 2 to 3 wt %.

Preferably the method further comprises filling the liquid dairy concentrate into a beverage capsule and/or pasteurising the liquid dairy concentrate. The capsule may be provided with a further packaging as desired.

Preferably substantially no further ingredients are added to the liquid dairy concentrate between homogenising and filing the liquid dairy concentrate into a beverage capsule. As will be appreciated, small amounts of ingredients, such as flavourings, especially liquid flavourings, may be added at this point, such as less than 1 wt % of the concentrate. Avoiding significant further additions prevents the risk of further additives encouraging the formation of butter. It was found that the provision of the homogeniser as a final step in the process, rather than an initial step before the addition of further ingredients to form a beverage concentrate, served to provide the highest product taste and texture quality. Furthermore, the results of a variety of trials indicated that homogenization, especially hot homogenisation, downstream in the process is the ideal unit operation to produce the highest quality finished products while allowing the greatest flexibility in storage of the process if so desired, without the production of butter in the storage tank. That is, if it is necessary to store the homogenised product, it remains stable. Whereas, if the dairy ingredient is pre-homogenised before the addition of the further ingredients, this benefit is compromised.

In traditional processes, it was known to homogenise the concentrated dairy ingredient after ultrafiltration. However, when moving from milk-based ingredients to higher fat cream-based ingredients, the inventors found that this approach led to butter formation during storage.

In particular, the inventors have found that when preparing a concentrated liquid dairy concentrate from a highly concentrated dairy fat source, there is a risk that the fat globule membranes may be destroyed and consequently free fat may be released. This is the initiation of butter development which, during storage, may render the concentrate unusable.

The inventors have found that it is possible to provide a concentrate sourced from a highly concentrated dairy fat source which when processed in a specific manner prohibits the destruction of fat globule membranes and consequently the release of free fat. Furthermore, the inventors found that it was possible to achieve this aim while allowing the intermediate products to be stored without forming butter.

As will be appreciated, the process described herein involves a number of sequential process steps which may be conducted at different temperatures. In order to move the retentate between these temperatures it is preferred to use a heat exchanger. Preferably the temperature changes are made as quickly as feasible in view of the bulk amount of retentate being processed, and preferably each heating or cooling step is conducted in less than 10 minutes, more preferably less than 5 minutes and preferably less than 1 minute for each individual portion of the retentate being handled.

According to a further aspect there is provided a liquid dairy concentrate obtainable by the method disclosed herein.

According to a further aspect there is provided a beverage capsule containing the liquid dairy concentrate as described herein and, optionally, means for foaming. Beverage capsules are well known in the art and any design suitable for holding a liquid ingredient may be employed, preferably the means for foaming is an eductor.

According to a further aspect there is provided a method of preparing a beverage, the method comprising introducing an aqueous medium into the capsule described herein to produce a beverage by dilution of the liquid dairy concentrate, and dispensing the beverage from the capsule.

According to a further aspect there is provided a system for preparing a beverage, the system comprising a capsule as described herein and a beverage preparation machine for providing a flow of aqueous medium through the capsule to dispense a beverage.

According to a still further aspect, based on the first aspect disclosed herein, there is provided a method of producing a liquid dairy concentrate, the method comprising:
  providing a liquid dairy ingredient having a fat content of at least 35 wt %;
  concentrating the liquid dairy ingredient by ultrafiltration and/or diafiltration at a temperature of at least 40° C. to obtain a concentrated liquid dairy ingredient as the retentate;
  adding sucrose and/or trisodium citrate to form a modified retentate; cooling the modified retentate to a temperature of at most 8° C. and storing it for at least 2 minutes,
  blending the modified retentate with one or more further ingredients; and
  homogenising the blend to form a liquid dairy concentrate,
  wherein, during the step of blending the modified retentate with said one ormore further ingredients, the retentate is at a temperature of at least 60° C.

According to a prefered example of the method, a liquid dairy concentrate is manufactured in the following steps:
  Cream is provided and pasteurised, then cooled and buffered.

The cream is then heated above 50° C. and subjected to ultrafiltration and diafiltration.

Sugar is added to the concentrated cream to form a slurry. The slurry is cooled to less than 8° C. for at least 30 minutes, then heated to above 70° C.

Liquid additions are made including an amount of water and microfiltrated milk concentrate.

Powder ingredients are then added including minerals.

The processed dairy liquid is then homogenised in a two step process at 200 and 20 Bar, then cooled below 8° C. for filling into beverage cartridges.

The filled and sealed beverage cartridges are then passed to a retort for pasteurisation.

The liquid additions include:
Liquid Micellular Casein Protein
Water

The powder ingredient additions include:
Sucrose
Dairy Minerals (Blend with higher Calcium)
Gum Arabic (Hydrocolloid)
Sodium Chloride
Natural Flavors (not in all formulations)
Trisodium Citrate The final product has a total solids of from 45 to 65 wt %, preferably 50-59 wt %; a fat content of 12 to 30 wt %, preferably 15-25 wt %; and a protein content of from 1 to 5 wt %, preferably 1.5-4%.

The salt is present in an amount of from 0.5 to 2 wt %, preferably 1 to 1.5 wt %; the sugar from 7 to 15 wt %, preferably 9 to 13 wt %; the added minerals in an amount of from 1 to 3 wt %, preferably 1.5 to 2.5 wt % (resulting in a calcium level in the finished product of 0.35 to 0.55 wt %); trisodium citrate in an amount of from 0.1 to 0.5 wt %, preferably 0.2 to 0.4 wt %; and gum arabic in an amount of from 0.25 to 1.5 wt %, preferably 0.5 to 1 wt %.

The casein enriched skimmed milk contrated (MF) is added in an amount of from 5 to 25 wt %, preferably 10 to 20 wt %.

Lactose in the final product (which is reduced from the levels in the cream due to the ultra- and diafiltration steps) are typically from 0.5 to 1.5 wt %, preferably 0.8 to 1.1 wt %.

All of the above ingredient ranges are contemplated individually as well as in combinations with the other listed ingredients. All percentages are by weight unless otherwise specified.

The invention will now be described in relation to the following non-limiting figures, in which.

Figure 1:
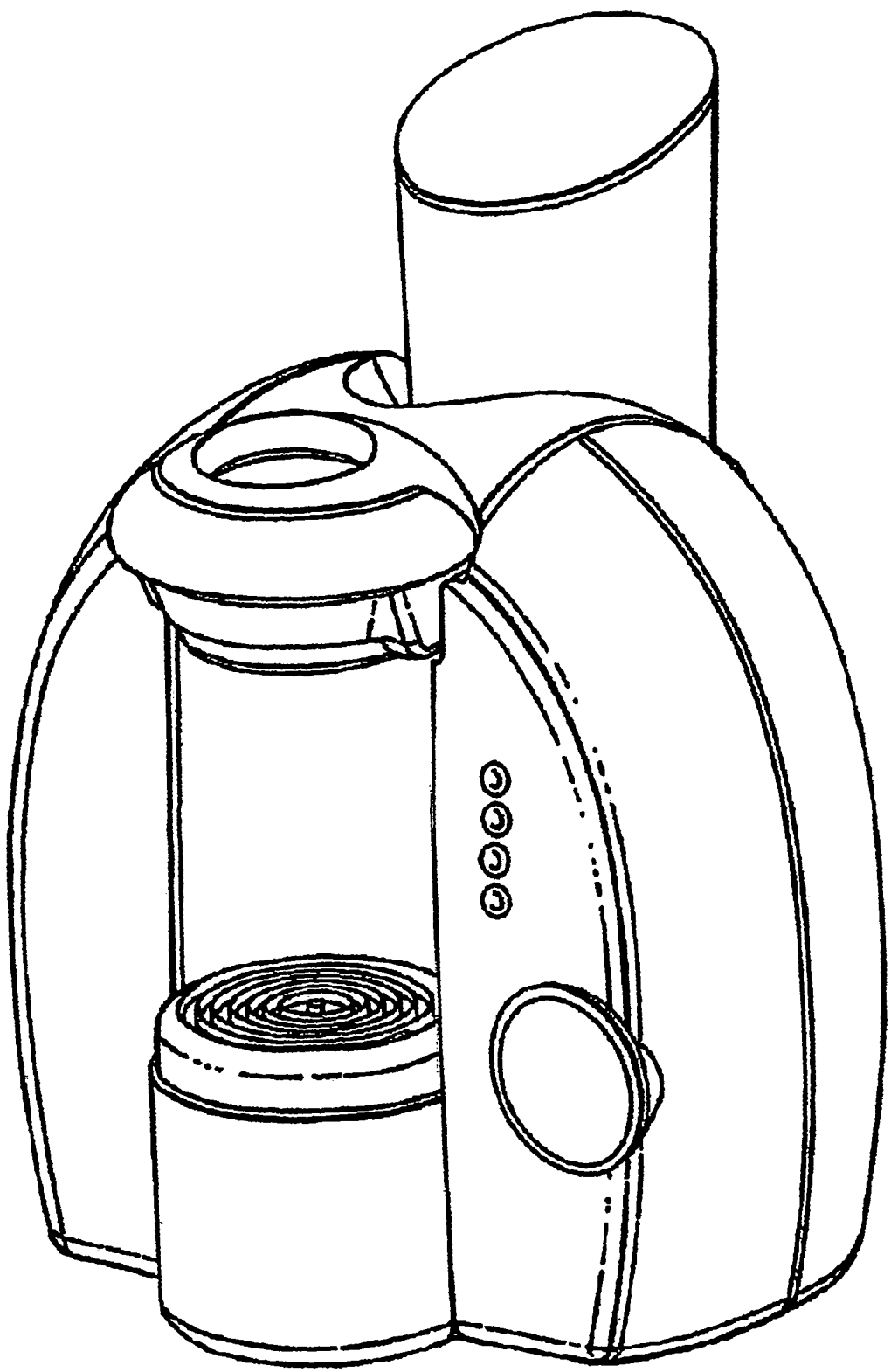
FIG. 1 shows a coffee beverage preparation system (1).
Figure 2:
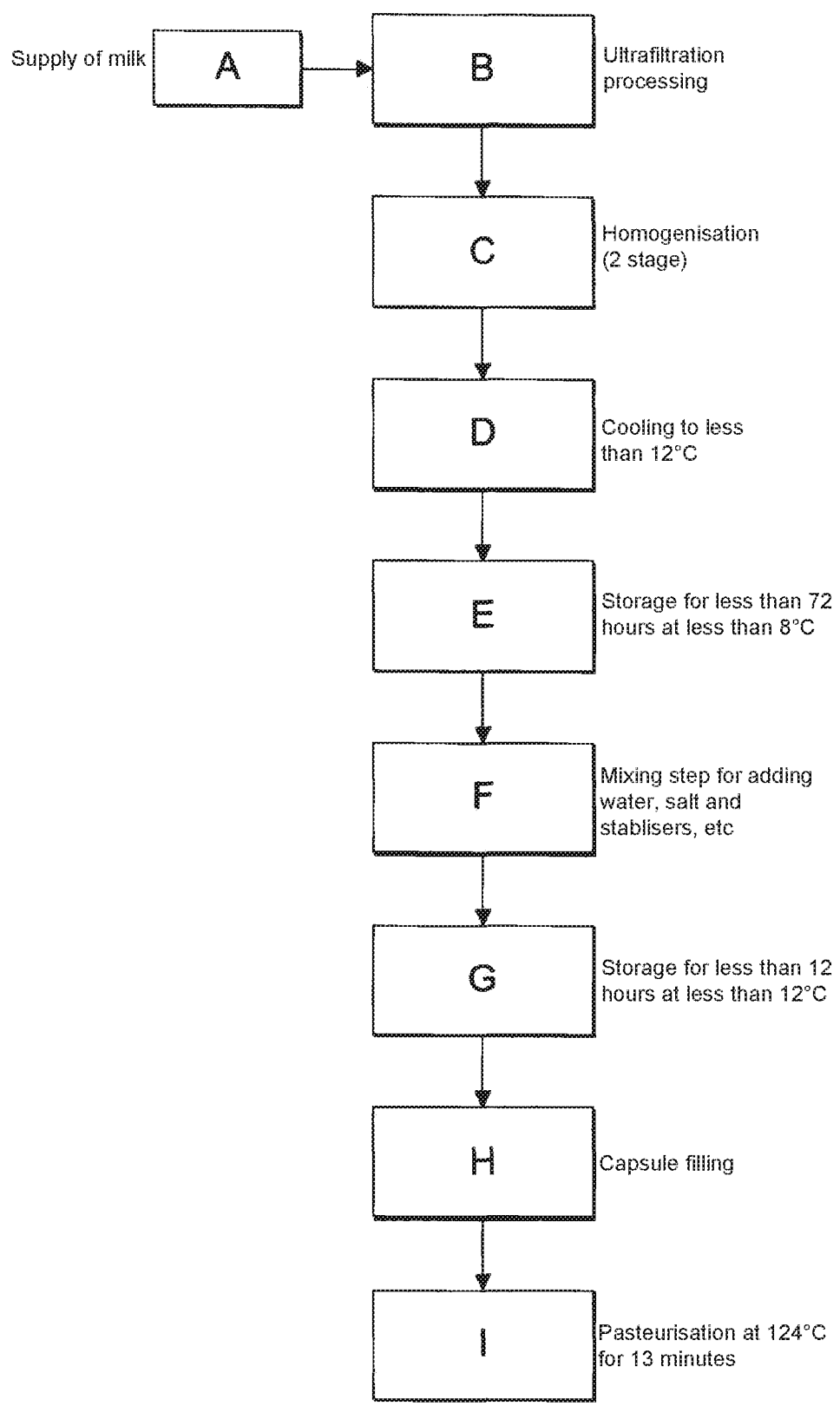
FIG. 2 shows an example of the process steps of a prior art method.
Figure 3:
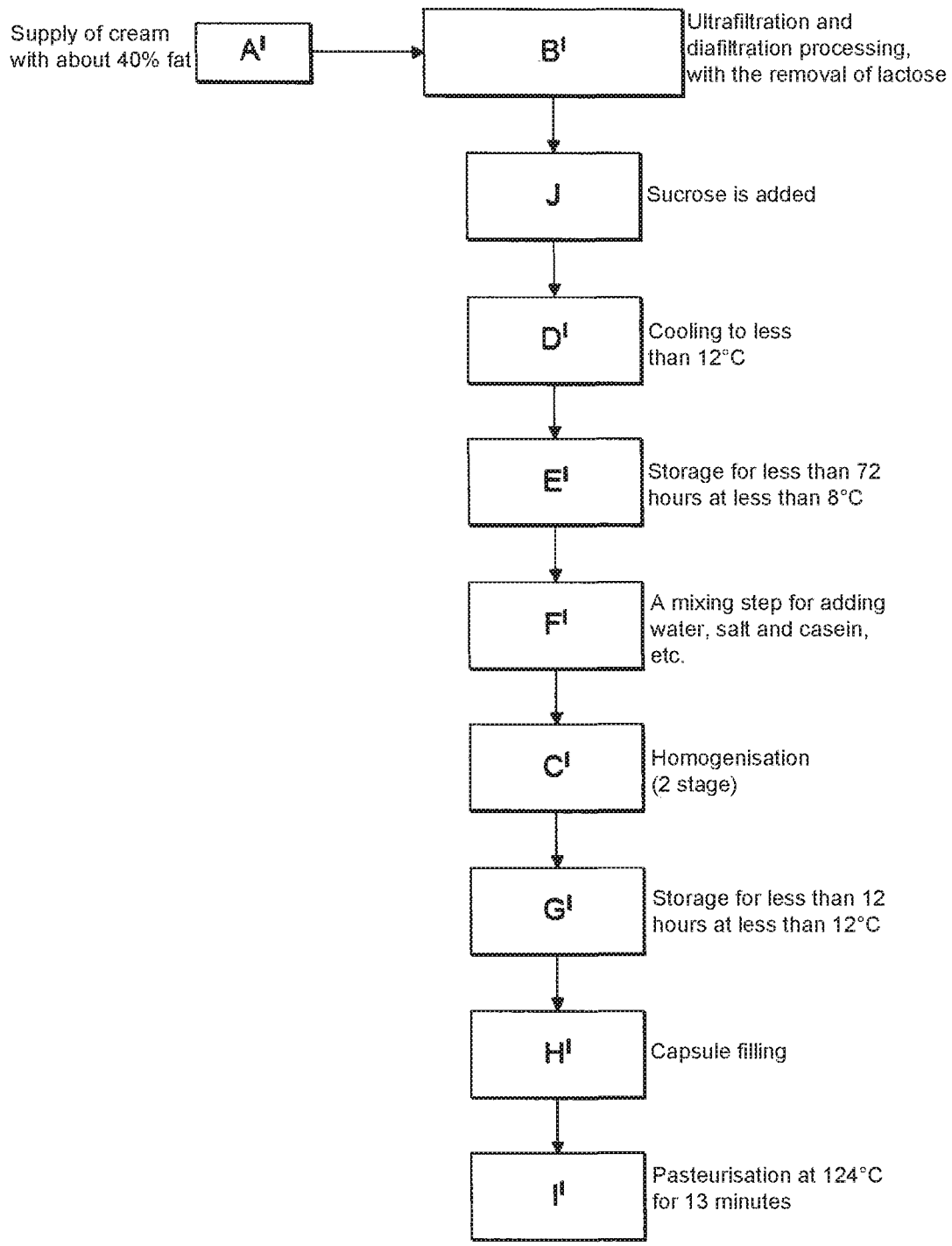
FIG. 3 shows an example of the process steps of the method described herein.

In FIG. 2, the flow chart boxes are as follows:
A—supply of milk
B—Ultrafiltration processing
C—Homogenisation (2 stage)
D—Cooling to less than 12° C.
E—Storage for less than 72 Hours at less than 8° C.
F—A mixing step for adding water, salt and stablisers (Etc.)
G—Storage for less than 12 Hours at less than 12° C.
H—Capsule filling
I—Pasteurisation at 124° C. for 13 minutes In FIG. 3, the flow chart boxes are as follows (like reference numerals have been used for clarity):

A'—supply of cream with about 40% fat
B'—Ultrafiltration and diafiltration processing, with the removal of lactose.

Step B' results in a concentrate having about 50% solids, 2-3% protein, 44%+ fat and less than 1% lactose.

After step B', sucrose is added in step J.
D'—Cooling to less than 12° C.
E'—Storage for less than 72 Hours at less than 8° C.
F'—A mixing step for adding water, salt and casein (Etc.)
C'—Homogenisation (2 stage)
G'—Storage for less than 12 Hours at less than 12° C.
H'—Capsule filling
I'—Pasteurisation at 124° C. for 13 minutes

DETAILED DESCRIPTIONS

The invention will now be described in relation to the following non-limiting examples.

EXAMPLES

Two cream-based concentrates were prepared and filled into beverage capsules. The concentrates were then pasteurised. The recipes for the two trial formulations were as follows:

Example 1

| Ingredient | Wt % |
|---|---|
| Ultrafiltrated and diafiltrated cream concentrate | 37.43 |
| Salt-Sodium Chloride | 1.2 |
| Sugar, Fine, Category 2 | 17.0 |
| DAIRY MINERALS | 2.2 |
| STABILISER | 0.88 |
| Trisodium Citrate Dihydrate | 0.175 |
| Flavouring | 0.1 |
| Casein Enriched Skim Milk concentrate | 10 |
| Water | 31.03 |
| Total | 100.0 |

The composition of Example 1 was produced as follows. A cream ingredient having a fat content of about 40 wt % was subjected to ultrafiltration and diafiltration to achieve a total solids of approximately 50 wt % and a low lactose content. These filtration steps were conducted at approximately 50° C.

The retentate was stored at 60° C. for up to 6 hours. The retentate was then mixed in a mixer with powders and flavour according to above formulas at 65° C. for a minimum mixing time of at least 7 minutes.

The mixture was then passed to a homogenizer and maintained at 65° C. It was homogenised at 142/20 bar in the 2 stages.

The mixture was then cooled to <10° C. in a wide gap plate and frame heat exchangers, and then filled into beverage capsules at a temperature of 5° C.<x<10° C. at 26.5 g fill weights. The closed capsules were then retorted at 124° C. for 11 to 14 minutes.

Example 2

| Ingredient | Percentages |
| --- | --- |
| Ultrafiltrated and diafiltrated cream concentrate | 56.6 |
| Salt-Sodium Chloride | 1 |
| Sugar, Fine, Category 2 | 25 |
| DAIRY MINERALS | 1.5 |
| STABILISER | 0.65 |
| Trisodium Citrate Dihydrate | 0.242 |
| Casein Enriched Skim Milk concentrate | 15 |
| Water | 0 |
| Total | 100.0 |

The composition of Example 2 was produced as follows. A cream ingredient having a fat content of about 40 wt % was subjected to ultrafiltration and diafiltration to achieve a total solids of approximately 50 wt % and a low lactose content. These filtration steps were conducted at approximately 50° C.

The retentate was then mixed with the sugar and trisodium citrate and cooled to a temperature of less than 8° C. for up to 72 hours.

The retentate was then reheated and mixed in a mixer with the remaining powders and flavour according to above formulas at 65° C. for a minimum mixing time of at least 7 minutes.

The mixture was then passed to a homogenizer and maintained at 65° C. It was homogenised at 142/20 bar in the 2 stages.

The mixture was then cooled to <10° C. in a wide gap plate and frame heat exchangers, and then filled into beverage capsules at a temperature of 5° C.<x<10° C. at 26.5 g fill weights. The closed capsules were then retorted at 124° C. for 11 to 14 minutes.

Comparative Example 1

The composition was produced as follows. A cream ingredient having a fat content of about 40 wt % was subjected to ultrafiltration and diafiltration to achieve a total solids of approximately 50 wt % and a low lactose content. These filtration steps were conducted at approximately 50° C.

The retentate was supplemented with microfiltrated milk concentrate and then passed to a homogenizer and maintained at 65° C. It was homogenised at 142/20 bar in the 2 stages.

The homogenised retentate was stored at 8° C. for 72 hours.

The retentate was then to be mixed in a mixer with powders and flavourings. However, the concentrate had formed a butter during storage.

Comparative Example 2

The composition was produced as follows. A cream ingredient having a fat content of about 40 wt % was subjected to ultrafiltration and diafiltration to achieve a total solids of approximately 50 wt % and a low lactose content. These filtration steps were conducted at approximately 50° C.

The retentate was passed to a homogenizer and maintained at 65° C. It was homogenised at 142/20 bar in the 2 stages.

The homogenised retentate was stored at 8° C. for 72 hours.

The retentate was then to be mixed in a mixer with powders and flavourings. However, the concentrate had formed a butter during storage.

Comparative Example 3

The composition was produced as follows. A cream ingredient having a fat content of about 40 wt % was subjected to ultrafiltration and diafiltration to achieve a total solids of approximately 50 wt % and a low lactose content. These filtration steps were conducted at approximately 50° C.

The retentate was then mixed with the sugar (sucrose) and trisodium citrate and cooled to a temperature of less than 8° C. for up to 72 hours.

The retentate was then mixed (at 50° C.) in a mixer with the remaining powders and flavour according to above formulas for a minimum mixing time of at least 7 minutes.

The mixture was then passed to a homogenizer. It was homogenised at 142/20 bar in the 2 stages.

The mixture was then cooled to <10° C. in a wide gap plate and frame heat exchangers, and then filled into beverage capsules at a temperature of 5° C.<x<10° C. at 26.5 g fill weights. The closed capsules were then retorted at 124° C. for 11 to 14 minutes.

In this example, some failure was seen in the process as the finished goods were slightly darker and more coffee intense.

Although preferred embodiments of the invention have been described herein in detail, it will be understood by those skilled in the art that variations may be made thereto without departing from the scope of the invention or of the appended claims.

The invention claimed is:

1. A method of producing a liquid dairy concentrate, the method comprising:
    providing a liquid dairy ingredient having a fat content of from 38 to 45 wt %, a solids content of from 30 to 55 wt %, and a protein content of from 2 to 3 wt %;
    concentrating the liquid dairy ingredient by ultrafiltration and/or diafiltration at a temperature of 40 to 60° C. to obtain a concentrated liquid dairy ingredient as a retentate, the retentate having a solids content of from 45 to 55 wt % and less than 1 wt % lactose;
    adding sucrose and/or trisodium citrate to the retentate to form a modified retentate;
    storing the modified retentate for at least 2 min and at most 72 hours at a temperature of at most 8° C.;
    blending the modified retentate with one or more further ingredients; and
    homogenising the blend to form a liquid dairy concentrate,
    wherein, during the step of blending the modified retentate with said one or more further ingredients, the modified retentate is at a temperature of at least 60° C.

2. The method according to claim 1, wherein, after the step of adding sucrose and/or trisodium citrate to the retentate to form the modified retentate, the modified retentate is stored for at most 24 hours at a temperature of at most 8° C.

3. The method according to claim 1, wherein the one or more further ingredients are selected from buffers, stabilisers, flavourings, minerals and casein.

4. The method according to claim 1, wherein the homogenising of the blend is a two-step high-pressure homogenisation, with a first step at from 100 to 300 bar and a second step at from 10 to 30 bar.

5. The method according to claim 1, wherein the retentate has at least 44 wt % fat.

6. The method according to claim 1, wherein during the step of blending the modified retentate with the one or more further ingredients, the modified_retentate is at a temperature of greater than about 65° C.

7. The method according to claim 1, wherein the liquid dairy ingredient comprises cream.

8. The method according to claim 1, wherein sucrose is added in an amount of from 10 to 40 wt %.

9. The method according to claim 1, wherein the one or more further ingredients comprise casein and wherein the casein is provided as a concentrated milk ingredient.

10. The method according to claim 1, wherein the method further comprises filling the liquid dairy concentrate into a beverage capsule and/or pasteurising the liquid dairy concentrate.

11. The method according to claim 10, wherein no further ingredients are added to the liquid dairy concentrate between homogenising and filing filling the liquid dairy concentrate into a beverage capsule.

12. The method according to claim 7, wherein the liquid dairy ingredient has a fat content of about 40 wt %.

13. The method according to claim 8, wherein the added sucrose has a granulated form.

14. A method of producing a liquid dairy concentrate, the method comprising:
  providing a cream having a fat content of from 38 to 45 wt %, a solids content of from 30 to 55 wt %, and a protein content of from 2 to 3 wt %;
  concentrating the cream by ultrafiltration and/or diafiltration at a temperature of 40 to 60° C. to obtain a concentrated cream as a retentate, the retentate having at least 44 wt % fat, a solids content of from 45 to 55 wt %, and less than 1 wt % lactose;
  adding sucrose and/or trisodium citrate to the retentate to form a modified retentate;
  storing the modified retentate for at least 2 min and at most 72 hours at a temperature of at most 8° C.;
  blending the modified retentate with one or more further ingredients; and
  homogenising the blend to form a liquid dairy concentrate,
  wherein, during the step of blending the modified retentate with said one or more further ingredients, the modified retentate is at a temperature of at least 65° C.

* * * * *